(12) United States Patent
Matuschek et al.

(10) Patent No.: US 6,914,440 B2
(45) Date of Patent: Jul. 5, 2005

(54) WELDING SYSTEM AND METHOD UTILIZING A GROUND INTEGRITY MONITOR

(75) Inventors: Ulrich Matuschek, Aachen (DE); Karl Pöll, Aachen (DE); Peter Usedom, Alsdorf (DE)

(73) Assignee: Matuschek Messtechnik GmbH, Alsdorf (DE)

(*) Notice: Subject to any disclaimer, the term of this patent is extended or adjusted under 35 U.S.C. 154(b) by 21 days.

(21) Appl. No.: 10/443,544

(22) Filed: May 22, 2003

(65) Prior Publication Data

US 2004/0135589 A1 Jul. 15, 2004

(30) Foreign Application Priority Data

Jan. 15, 2003 (DE) .......................................... 103 01 331

(51) Int. Cl.[7] .................. G01R 27/08; G01R 31/14; B23K 11/24
(52) U.S. Cl. .................... 324/691; 324/510; 219/109
(58) Field of Search .............................. 324/691, 509, 324/510, 511, 525; 219/119, 110

(56) References Cited

U.S. PATENT DOCUMENTS

| | | | | |
|---|---|---|---|---|
| 4,507,699 A | * | 3/1985 | Rohm | ...................... 361/50 |
| 4,963,830 A | * | 10/1990 | Roth et al. | .................. 324/715 |
| 5,021,625 A | * | 6/1991 | Destefan et al. | ............ 219/109 |
| 6,437,951 B1 | * | 8/2002 | Ahlstrom et al. | ............. 361/42 |
| 6,657,163 B1 | * | 12/2003 | Blankenship et al. | .... 219/137.1 |

* cited by examiner

Primary Examiner—Anjan Deb
Assistant Examiner—John Teresinski
(74) Attorney, Agent, or Firm—Choate, Hall & Stewart LLP

(57) ABSTRACT

A welding system having a welding gun, comprising a casing that is grounded through a ground conductor, and a monitoring device, which detects the resistance of the ground conductor. A blanking device deactivates the monitoring device during the welding operation to reduce the danger of shut-downs through the ground integrity monitor. It is proposed to either deactivate the measuring circuit of the ground integrity monitor or to switch off the welding power interruption associated therewith as long as a welding current may flow or is flowing through the ground conductor. The monitoring device is deactivated or blanked out only for an essentially negligible fraction of the entire time, and there is no danger of any impairment of safety due to this short-term deactivation.

25 Claims, 1 Drawing Sheet

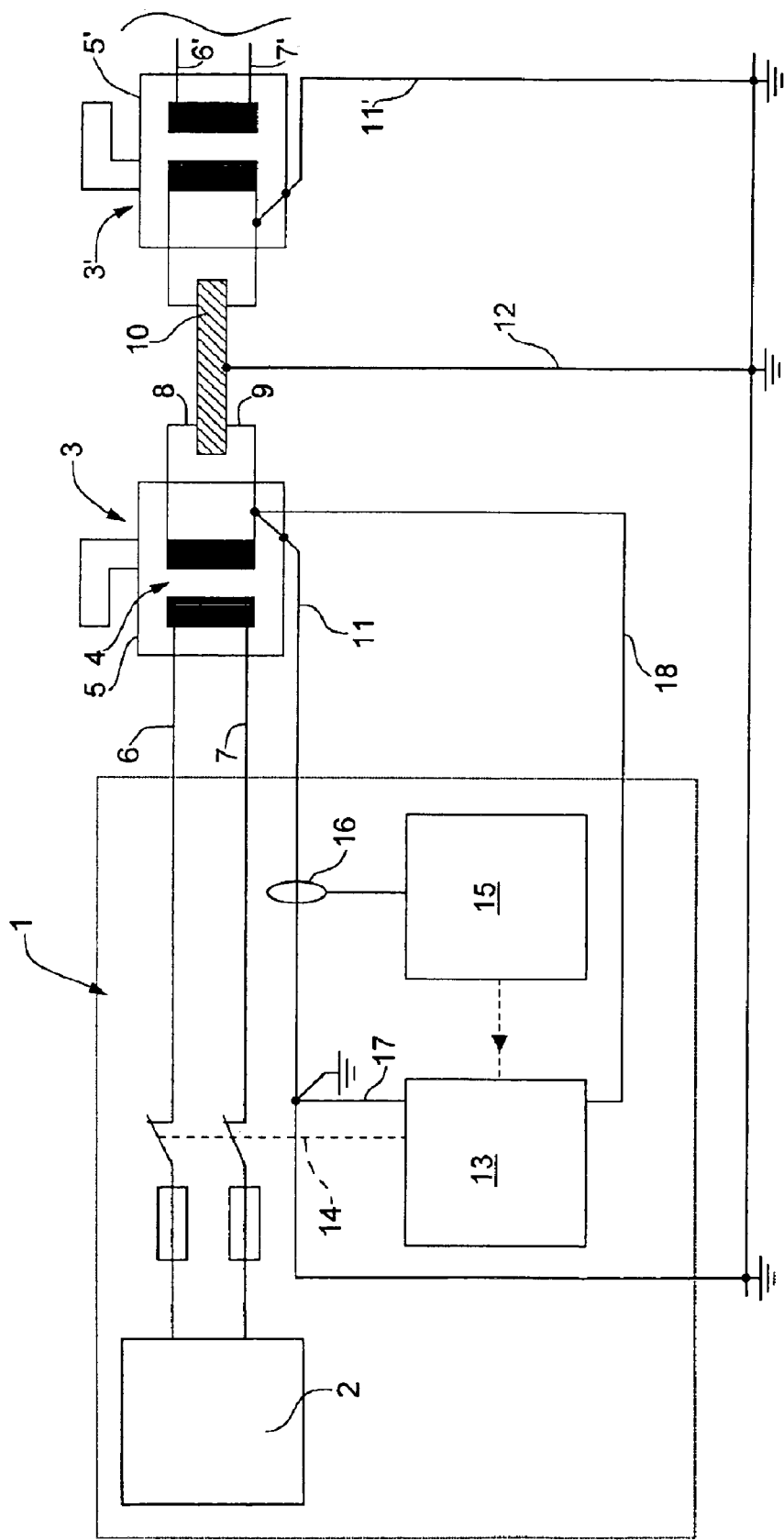

WELDING SYSTEM AND METHOD UTILIZING A GROUND INTEGRITY MONITOR

BACKGROUND OF THE INVENTION

1. Field of the Invention

The present invention is directed to the field of welding and more particularly to a welding system utilizing a ground integrity monitor and to a method for monitoring the resistance of a ground conductor.

2. Description of the Prior Art

Hand-welding guns are welding guns that are manually brought to their position on the workpiece to be welded. They are usually fastened to a balancer, i.e., a balancing mechanism, which bears the weight of the welding gun and facilitates the manual alignment of the welding gun.

There are essentially two different types of hand-operated welding guns, namely a first type without an integrated welding transformer and a second type having an integrated transformer. In the first type, the transformer itself is fastened to a rod of the balancer and does not follow all the movements of the welding gun. The disadvantage of these welding guns is that they require long cables for the secondary power supply. The secondary power exhibits very high amperage, for example, 10,000 A. The secondary power supply therefore requires very thick conductors, and over long distances, generates considerable loss because of the conductor resistance.

For this reason, transformer guns in which a welding gun including an integrated transformer is fastened to the balancer are preferred as hand-welding guns. Though a transformer gun may, because of the transformer, weigh more than a welding gun without a transformer, it generates insignificant losses because of the short secondary high-amperage power cables.

A disadvantage of a transformer gun is that a medium voltage of 500 V, for instance, which may be dangerous to the operating personnel, is supplied to its transformer. For this reason, increased safety demands are set for transformer guns.

Such types of welding guns are monitored through ground fault current interrupters. A ground fault current interrupter monitors the fault current to ground. Ground fault current interrupters, or GFCIs, are adequately known from the related art. In welding equipment, normal GFCIs disconnect the power supply within a very short time, e.g., 30 ms, in the event of fault currents between 10 and 30 mA.

In the U.S. in particular, an additional safety circuit is required. This is achieved through safety devices in the primary power supply, which switch off the electric power supply in the event of a discharge of the primary power to ground. For this safety circuit, it is necessary for the ground conductor of the casing of the welding guns to be operative. In order to ensure the reliable functioning of this additional safety device, the integrity of the ground conductor is monitored. This testing device is normally called a "ground integrity monitor" and will be referred to as such within the scope of this application.

The ground integrity monitor conducts a testing current, e.g., 20 mA, through the ground conductor between the casing and the control box for the welding power supply. The voltage generated through this testing current is measured between the start and end of the ground conductor and the resistance is deduced therefrom. If the resistance determined exceeds an acceptable value of, for instance, 1 Ω, the welding power supply is cut off. The power is switched off very quickly, e.g., within less than one second.

During the welding, as a result of interference effects, the welding current is partially conducted from one electrode to the other not through the workpieces, but through the ground conductor. The workpieces themselves are also grounded, so that current may flow from the first electrode through the workpiece to ground, and subsequently, through the ground conductor to the welding gun casing and back to the second electrode. This welding current flowing through the ground conductor may result in malfunctions in the ground integrity monitor. In the past, when measuring the resistance of the ground conductor for the casing, there were attempts to filter out the welding current flowing through the ground conductor. This was not always totally successful, however, resulting in wrong welding power shut-downs occurring when the ground conductors were intact.

It is desirable to reduce the danger of shut-downs through the ground integrity monitor during the welding operation despite an intact ground conductor.

SUMMARY OF THE INVENTION

In one aspect, the present invention provides for a welding system having a welding gun, comprising a casing that is grounded through a ground conductor, and a monitoring device, which detects the resistance of the ground conductor.

In another aspect, the invention provides for a method of monitoring the resistance of a ground conductor, which grounds a casing of a welding gun of a welding system, the power supply to the welding gun being interrupted in the event of excessively high resistance.

The welding system described herein further provides for a blanking device, which deactivates the monitoring device during the welding operation.

In other words, it is proposed to either deactivate the measuring circuit of the ground integrity monitor or to switch off the welding power interruption associated therewith as long as a welding current may flow or is flowing through the ground conductor. The ground integrity monitor is therefore blanked. The periods of the actual welding power supply amount to only a fraction of the entire operation time of a welding system. As a rule, the welding current is switched on for each welding spot only for a fraction of a second. For this reason, the monitoring device is deactivated or blanked out only for an essentially negligible fraction of the entire time. There is no danger of any impairment of safety due to this short-term deactivation.

In a practical embodiment, the blanking device is arranged so that the monitoring device is deactivated in the time segments in which welding current is being fed. This may be induced, for example, by a control signal, also called a blanking signal, which is transmitted by the welding current controller to the blanking device. In this case, the welding current controller short-circuits the measuring circuit as long as the welding current is activated.

In larger welding systems, there may be several welding current controllers that supply several welding guns with current. Thus, the power may flow from several welding guns through a ground conductor of a welding gun casing. In this case, a signal line may conduct a blanking signal to the blanking device as soon as one of the mentioned welding current controllers provides one of the mentioned welding guns with current.

Another practical embodiment works with a measuring device for the current flowing through the ground conductor.

In this embodiment, the blanking device is arranged so that the monitoring device is deactivated only during the time segments in which an interference current actually flows through the ground conductor. This interference current is detected by the measuring device which then leads to interrupting the conventional ground integrity monitoring. In this embodiment, there is practically no interruption of the resistance monitoring of the earth conductor. The conventional ground integrity monitoring takes place during the welding pauses. For this purpose, a testing current may be introduced into the earth conductor and the voltage generated by the testing current is measured. Conversely, a test voltage may also be applied to the ground conductor and the current resulting therefrom may be measured. Direct currents, alternating currents, direct voltages, and alternating voltages may be used to test the integrity of the ground conductor.

A current sensor may be provided as measuring device, which detects the current flowing through the ground conductor. When the current sensor measures a current above a threshold value (e.g., 1 A), there is the danger that the voltage measurement for the resistance monitoring will be distorted. In this case, the monitoring device is deactivated.

Nevertheless, the conducting capacity of the ground conductor is continued to be ensured. The fact that a flow of current is detected through the current sensor indicates that the flow of current cannot be interrupted in the ground conductor. In this embodiment, the ground conductor resistance is consequently determined in the conventional manner during the welding pauses by measuring the voltage between the two ends of the ground conductor on the basis of a testing current. When welding takes place and, because of this welding, a strong interference current flows through the ground conductor, the current flowing—as described above—through the grounding of the workpiece to be welded and through the ground conductor back to one of the electrodes of the welding guns, then detecting this current ensures that the ground conductor is electrically conductive.

As mentioned, the monitoring device contains, in a practical embodiment, a measuring system for measuring the voltage in the ground conductor, which arises as a result of a predetermined testing current introduced into the ground conductor. The testing current has very low amperage, for example, in the range of 20 mA. The voltage is detected at two inputs of the measuring system.

In another practical embodiment, the present invention is provided for use in combination with a device for supplying welding power to welding gun designed as a transformer gun. A transformer gun, or a "trans gun", for short, is a set of welding tongs or pincers having an integrated welding transformer. The transformer includes a primary circuit, which is connected to the welding current controller, and a secondary circuit, which is connected to the welding electrodes. The secondary circuit includes mostly only a few windings (e.g., two windings), which are made of a very good conductor, such as copper, having a large cross-section. This secondary winding of the transformer is grounded in a practical embodiment, as a result of which the problem of the welding current flow through the ground conductor arises.

With respect to the method of monitoring the resistance of a ground conductor, which grounds a casing of a welding gun of a welding system, the power supply to the welding gun being interrupted in the event of excessively high resistance, the object according to the present invention is achieved in that the monitoring of the ground conductor is deactivated during the welding operation.

Again, two different criteria for determining the moments for deactivating the monitoring may be applied. The monitoring may be deactivated when the welding current controller(s) conduct(s) welding current to the welding gun(s). One or several welding current controllers may generate blanking signals, which cause the deactivation of the monitoring.

Alternatively, the monitoring may be deactivated when a welding current (interference current) flows through the ground conductor. The welding current may be detected through a current sensor.

In another practical embodiment, the interference current may be measured in the control box containing the welding current controller, i.e., at a distance from the casings of the welding guns. A measured interference current ensures that the ground conductor is functioning in the blanking periods, since an interference current may flow only through an electrically conductive ground conductor.

To measure the current in the ground conductor, a Hall sensor may be used in practice.

BRIEF DESCRIPTION OF THE DRAWING

A practical embodiment of the present invention will be described below, with reference to the attached drawing.

The FIG. 1 shows a schematic circuit diagram of a welding system according to one embodiment of the present invention.

DETAILED DESCRIPTION OF VARIOUS EMBODIMENTS

As shown in the FIG. 1 a welding system according to the present invention includes a welding current controller, generally referenced with reference number 1. Welding current controller 1 includes power supply 2 for output of the primary current. Power supply 2 may be a common power supply network. In modem welding systems, a current inverter is used as power supply 2. In a practical embodiment, the current inverter delivers a chopped current at a medium voltage of about 500 V.

A welding gun 3 is positioned at a distance from welding current controller 1. It includes welding transformer 4 and casing 5. The primary side of welding transformer 4 is connected to welding current controller 1 via two cables 6,7. The secondary side of welding transformer 4 is connected to two welding electrodes 8, 9, which clamp workpiece 10 to be welded, for example, two or more sheets to be welded together.

On the right end of workpiece 10, second welding gun 3' may be seen. Its cables 6', 7' may be connected either with another or with the same welding current controller 1 as that of first welding gun 3.

Casings 5, 5' of welding guns 3, 3' are connected with the ground through ground conductors 11, 11'. Workpiece 10 is also grounded through ground conductor 12.

Safety circuit 13 is provided in the control box of the welding controller. Safety circuit 13 includes a ground fault current interrupter, which interrupts the welding power supply as soon as a fault current is diverted to ground. The fault current is measured via a test line 14 near power supply 2. Furthermore, a ground integrity monitor is provided in the safety circuit, which interrupts the welding power supply as soon as it is determined that the resistance in ground conductor 11 to casing 5 of welding guns 3 is excessive. For this purpose, a weak testing current is generated in safety circuit 13, which is fed via test lines 17, 18 to the start and end of ground conductor 11. The voltage between the start and end of ground conductor 11 is measured and the resistance of the ground conductor is determined therefrom. The ground fault current interrupter as well as the ground integrity monitor are known from the related art and do not need to be described further here.

As mentioned, interference with the ground integrity monitor may occur if a welding current flows from workpiece 10 through its ground conductor 12 to welding current controller 1 and then from here, through ground conductor 11, into casing 5 of welding guns 3. Such interference currents appear under different operating conditions of the welding system and are largely unavoidable. Since the welding power has a low voltage, the interference currents are not dangerous. However, they may result in a malfunction of the ground integrity monitor in safety circuit 13, as a result of which the welding operation is unnecessarily interrupted.

In order to avoid such types of malfunctions, blanking device 15 is provided, which interrupts the ground integrity monitor at certain times of the welding operation or basically during the welding power supply. Blanking device 15 is arranged within welding current controller 1. Blanking device 15 may receive a blanking signal as soon as the power supply feeds a welding current into the primary side of welding transformer 3. Blanking device 15 is provided with current sensor 16, which measures the current flowing through ground conductor 11. Such current sensor 16 is available in the market and may, for example, be made of a circular magnetic core encompassing ground conductor 11, the magnetic core having a Hall sensor accommodated in its slit. As soon as current sensor 16 measures an unacceptable interference current through ground conductor 11, blanking device 15 deactivates the ground integrity monitor in safety circuit 13. For this purpose, for example, the resistance measurement in the safety circuit 13 may be bypassed or the power interruption may be deactivated.

At the time when excessively high currents are measured in ground conductor 11, it is ensured that this is not interrupted, since a flow of current would otherwise not be possible.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A welding system, comprising:
   a welding gun having a casing, which is grounded through a ground conductor,
   a monitoring device, which detects resistance of the ground conductor, and
   a blanking device, which deactivates the monitoring device during a welding operation.

2. The welding system of claim 1, wherein the blanking device is positioned so that the monitoring device is deactivated during the time segments in which a welding current is being supplied.

3. The welding system of claim 2, further comprising a welding current controller, wherein a signal line is provided between the welding current controller and the blanking device, which during the time segments in which a welding current is being supplied, transmits a blanking signal to the blanking device.

4. The welding system according to claim 3, further comprising a transformer situated in the casing of the welding gun and having a primary winding and a secondary winding.

5. The welding system of claim 2, further comprising several welding current controllers for the power supply to several welding guns, wherein a signal line leads to the blanking device, which during the time segments in which a welding current is being supplied from one of the welding current controllers, transmits a blanking signal to the blanking device.

6. The welding system according to claim 5, further comprising a transformer situated in the casing of the welding gun and having a primary winding and a secondary winding.

7. The welding system according to claim 2, further comprising a transformer situated in the casing of the welding gun and having a primary winding and a secondary winding.

8. The welding system of claim 1, wherein the blanking device is positioned so that the monitoring device is deactivated during the time segments in which a welding current flows through the ground conductor.

9. The welding system of claim 8, further comprising a current sensor, which detects the current flowing through the ground conductor.

10. The welding system according to claim 9, further comprising a transformer situated in the casing of the welding gun and having a primary winding and a secondary winding.

11. The welding system according to claim 8, further comprising a transformer situated in the casing of the welding gun and having a primary winding and a secondary winding.

12. The welding system of claim 1, wherein the monitoring device comprises a measuring system for measuring the voltage in the ground conductor, the voltage being generated in the ground conductor by a predetermined testing current.

13. The welding system of claim 12, wherein the measuring system comprises two inputs of the measuring system for voltage measuring, and the blanking device short-circuits said two inputs.

14. The welding system according to claim 13, further comprising a transformer situated in the casing of the welding gun and having a primary winding and a secondary winding.

15. The welding system according to claim 12, further comprising a transformer situated in the casing of the welding gun and having a primary winding and a secondary winding.

16. The welding system according to claim 1, further comprising a transformer situated in the casing of the welding gun and having a primary winding and a secondary winding.

17. The welding system of claim 16, wherein the secondary winding of the welding transformer is grounded.

18. A method of monitoring the resistance of a ground conductor, which grounds a casing of a welding gun of a welding system, a power supply to the welding gun being interrupted in the event of excessively high resistance, wherein the monitoring of the ground conductor is deactivated during a welding operation.

19. The method of claim 18, wherein the monitoring of the ground conductor is deactivated during the time segments in which welding current is being supplied.

20. The method of claim 19, wherein a blanking signal is generated by a welding current controller during the time segments in which welding current is being supplied, and the monitoring of the ground conductor is deactivated during the appearance of the blanking signal.

21. The method of claim 19, wherein each of several welding current controllers in a welding system generates blanking signals during the time segments in which the particular welding current controller supplies welding current, and the monitoring of the ground conductor is deactivated during the appearance of one of said blanking signals.

22. The method of claim 18, wherein the monitoring of the ground conductor is deactivated during the time segments in which welding current flows through the ground conductor.

23. The method of claim 22, wherein the current flowing through the ground conductor is detected by a current sensor.

24. The method of claim 23, wherein the current sensor is a Hall sensor.

25. A method of monitoring the resistance of a ground conductor, comprising:

grounding a casing of a welding gun of a welding system with said ground conductor, interrupting a power supply to the welding gun in the event of excessively high resistance in said ground conductor, and deactivating the monitoring of the ground conductor during a welding operation.

* * * * *